United States Patent
Ohnaka

[11] 3,910,535
[45] Oct. 7, 1975

[54] APPARATUS FOR SUPPORTING A MANIPULATOR ARM

[75] Inventor: Makoto Ohnaka, Yokohama, Japan

[73] Assignee: Shiroyama Kogyo Kabushiki Kaisha, Japan

[22] Filed: July 10, 1974

[21] Appl. No.: 487,063

[30] Foreign Application Priority Data
Apr. 8, 1974 Japan............................... 49-39957

[52] U.S. Cl............................. 248/16; 269/59
[51] Int. Cl.² .. F16F 15/00; F16M 1/00; B23Q 3/18
[58] Field of Search ........... 248/289, 282, 283, 278, 248/16; 269/79, 58, 59, 60, 61, 62, 56; 214/1 QF

[56] References Cited
UNITED STATES PATENTS

| | | | |
|---|---|---|---|
| 1,223,085 | 4/1917 | Manierre | 248/283 |
| 1,297,463 | 3/1919 | Hallenbeck | 269/56 |
| 2,210,235 | 8/1940 | Filbert | 248/289 X |
| 2,549,606 | 4/1951 | Hudson | 269/58 X |
| 2,550,818 | 5/1951 | Johnson | 248/283 X |
| 2,934,300 | 4/1960 | Shanklin | 248/289 |
| 3,301,547 | 1/1967 | Jordan | 269/58 X |
| 3,717,000 | 2/1973 | Rothwell | 269/58 |

Primary Examiner—J. Franklin Foss
Attorney, Agent, or Firm—Frank J. Jordan

[57] ABSTRACT

Apparatus for supporting a manipulator on a machine frame includes a support arm carrying a manipulator device on one end and having its other end pivotally mounted on the machine frame about a vertical axis. The support arm is adapted to be pivoted and secured in an operative position wherein the manipulator device is operable to perform manipulating functions on a workbench on the machine and to be pivoted and secured in a second position disposed to one side of the workbench to provide unobstructed and ready access to the workbench.

2 Claims, 4 Drawing Figures

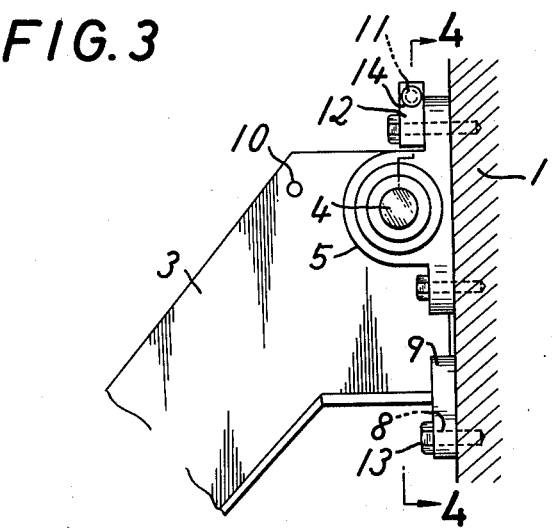
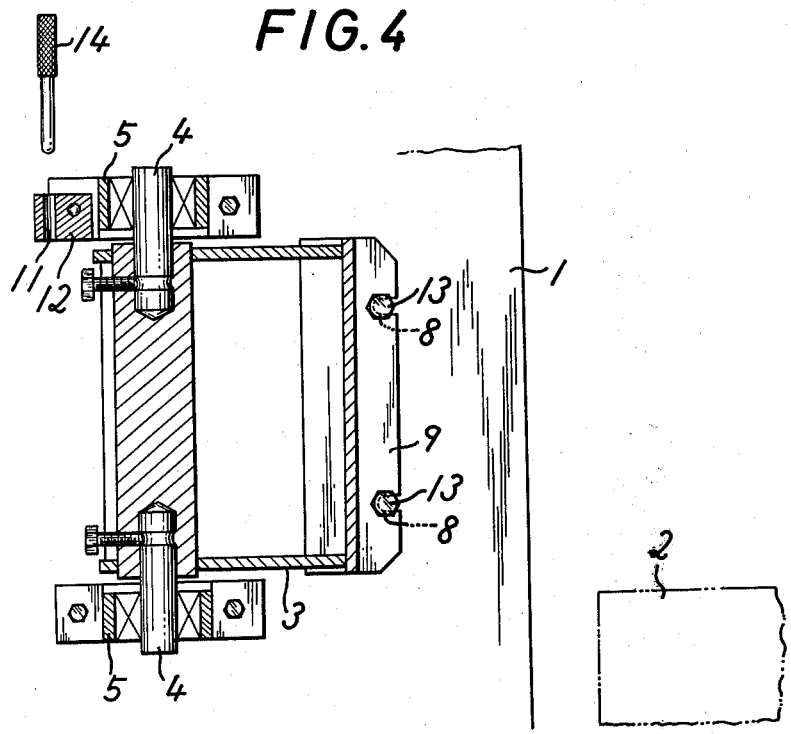

APPARATUS FOR SUPPORTING A MANIPULATOR ARM

BACKGROUND OF THE INVENTION

This invention relates to an apparatus for supporting a manipulator arm and more particularly to an apparatus which provides for securing the manipulator arm in various positions depending on the operability of the manipulator arm.

In machine tools such as a press, a drilling machine or the like, there is often provided a workbench in front of the machine frame. Also a manipulator arm is provided on the upper side of the workbench which is operable to be moved laterally, vertically and rotatably in order to deposit or remove work pieces on the workbench or to change its position or direction.

In such machines the manipulator arm protrudes from the side of the workbench of the machine frame and frequently is a hindrance and becomes an obstacle when the manipulator arm is not in use.

Accordingly, an object of the present invention is to overcome the disadvantages of known prior art arrangements and to provide an apparatus for supporting a manipulator arm which enables the latter to be moved and secured in a position which provides ready access to the machine and the workbench of the machine on which the manipulator is installed.

Another object of the present invention is to provide for movement of a manipulator device between operative and nonoperative positions thereby selectively controlling ready access to the machine on which the manipulator device is installed while still providing use and operation of the machine and manipulator device.

Another object of the present invention is to provide an apparatus in the form, construction, and arrangement of the various elements whereby the above named and other object may be effectively obtained.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and operation of the invention, however, together with additional objects and advantages thereof will be best understood from the following description of specific embodiments when read in connection with the accompanying drawings.

SUMMARY OF THE INVENTION

Apparatus for supporting a manipulator on the frame of a machine or the like includes a support arm for the manipulator and pivotal means pivotally supporting one end of the support arm on the machine frame for pivotal movement about a vertical axis. A manipulator device is carried on the other end of the support arm and the latter is pivotal between an operative position wherein the manipulator device is operable to perform manipulating functions on a workbench on the machine and a second position wherein the support arm and manipulator device are in a position disposed to one side of the workbench to provide unobstructed and ready access to the workbench. Means are provided for securing the support arm to the machine frame in the aforementioned operative or the aforementioned second position of the support arm.

BRIEF DESCRIPTION OF THE DRAWINGS

FIG. 3 is an enlarged fragmental plan view of a portion of the apparatus shown in FIG. 1.

FIG. 4 is an enlarged sectional view taken along the line A—A in FIG. 3.

DESCRIPTION OF THE PREFERRED EMBODIMENTS

Figure 1:
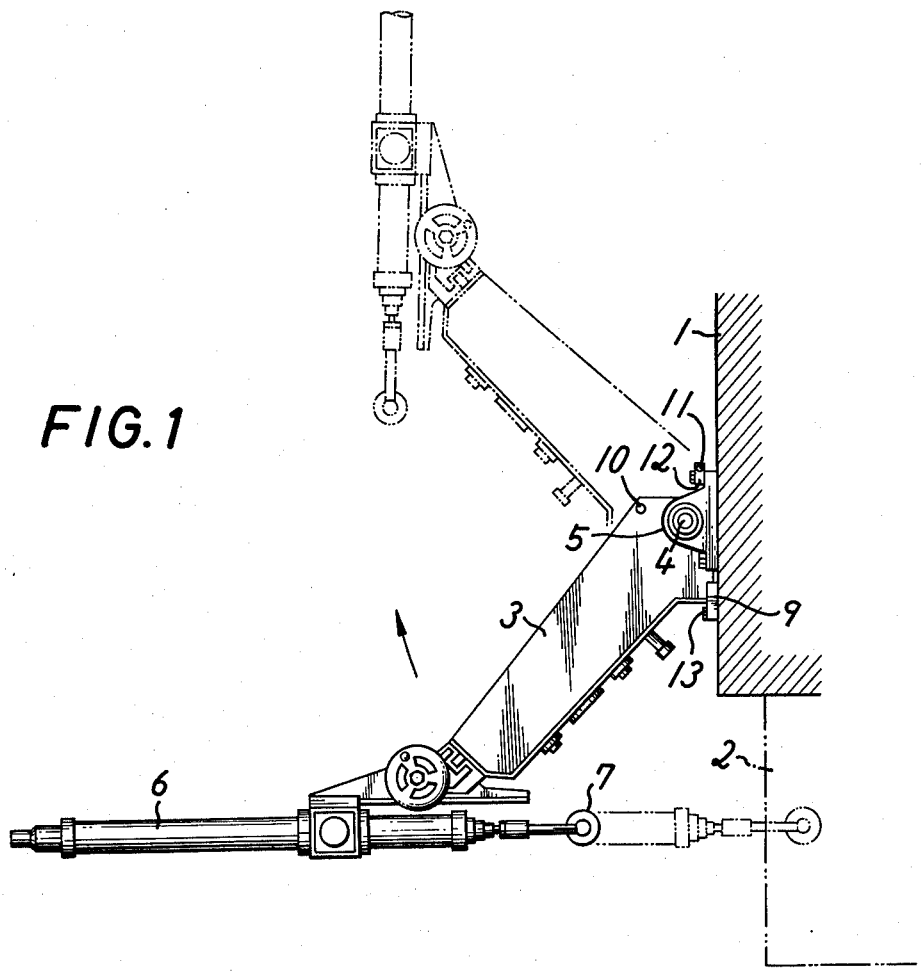
FIG. 1 is a plan view of an apparatus for supporting a manipulator arm according to one embodiment of the invention in which the operative position of the support arm is shown in solid lines and in which a non-operative position of the support arm is shown in broken lines.
Figure 2:
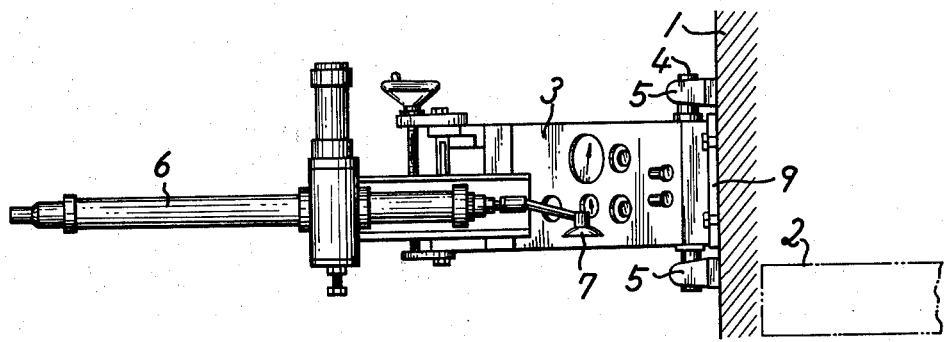
FIG. 2 is an elevational or front view of the apparatus shown in FIG. 1.

Referring to the drawings, there is shown a machine frame 1 of a press or other appropriate machine. A workbench 2 extends to the front of the machine frame 1 as shown in the drawings.

A support arm 3 is pivotally supported from the machine frame 1 and to this end, the support arm 3 is provided with vertical shafts 4 extending from the upper and lower sides thereof. spaced bearing supports 5 are suitably secured to the machine frame 1 and the vertical shafts 4 are rotatably received and supported in the bearing supports 5 to thereby provide the pivotal and bearing support for the support arm 3.

Appropriately mounted on the free end portion of the support arm 3 is a manipulator device of arm 6 which is adapted to rotate, to move in lateral and vertical directions, and to perform other manipulative movements in response to the required operation. The manipulator arm 6 has at its lower front end an appropriate handle 7 suitably affixed thereto. However, a detailed description of the structure and operation of the manipulator arm 6 is not set forth as such structure and operation is not directly related nor necessary to understand the present invention.

A retaining segment 9 is securely fixed to the front end portion of the base of the support arm 3. This retaining element 9 is provided with spaced openings 8 as best shown in FIGS. 3 and 4.

At an appropriate rear end section of the base of the support arm 3 there is provided a vertical hole 10. In addition to the above there is also provided a stop member 12 at a suitable side portion of the machine frame 1. The stop member 12 has a hole which is adapted to be in axial alignment with the vertical hole 10 in the support arm 3 when the latter has been swung about the vertical shafts 4 to the non-operative or broken line position shown in FIG. 1 as will be further described.

The positioning of the support arm 3 relative to the machine frame 1 is determined based on various factors such as the size of the arm 6 for the manipulator and other related portions in order to achieve the object as will be hereinafter described.

Having described the structure and arrangement of the various parts, the description of the apparatus will now be set forth. When the manipulator arm 6 is placed in the desired operable position, the support arm 3 is disposed in the solid line position shown in FIG. 1 and suitable threaded bolts 13 are provided which are inserted within the openings 8 of the retaining segment 9 and which are threaded into the machine frame 1. Accordingly, the bolts 8 secure the support arm 3 in the operative or solid line position shown in FIG. 1.

When the manipulator arm 6 is not being used or not in use and it is desired to dispose it in a position where it will not hinder or become an obstacle to further working or operating within the immediate area of the machine and the workbench 2, the bolts 13 are removed, thereby freeing the support arm 3 and the latter is pivoted clockwise as viewed in FIG. 1 from the solid line to the broken line position (FIG. 1) wherein the hole 10 in the support arm 3 will be vertically aligned with the hole 11 in the stop member 12. Accordingly, a knocking pin 14 may be inserted in the vertically aligned holes 10, 11 to thereby secure the manipulator support arm 3 in its non-operative position removed from the front of the workbench 2. In this position, the area around the workbench 2 is free of obstacles whereby any additional required work may be freely performed.

The means for the locking the support arm 3 to the machine frame 1 as regards the threading and rearward swinging action thereof may be appropriately changed for use.

It is thought that the invention and many of its attendant advantages will be understood from the foregoing description and that it will be apparent that various changes may be made in the form, construction, and arrangements of the parts without departing from the spirit and scope of the invention or sacrificing all of its material advantages. The form heretofore described being merely a preferred embodiment thereof.

What is claimed is:

1. Apparatus for supporting a manipulator on the frame of a machine or the like comprising a support arm for said manipulator, pivotal means pivotally supporting one end of said support arm on said machine frame for pivotal movement about a vertical axis, a manipulator device carried on the other end of said support arm, said support arm being pivotal between an operative position wherein said manipulator device is operable to perform manipulating functions on a workbench on said machine and a second position wherein said support arm and manipulator device are in a position disposed to one side of said workbench to provide unobstructed and ready access to said workbench, said support arm having a base portion which extends substantially perpendicularly from said machine frame when said support arm is in said operative position and an outer portion disposed at an obtuse angle relative to said base portion, said base portion of said support arm extending substantially parallel to said machine frame when in said second position, a stop member secured to said machine frame and having a vertically disposed opening, said support arm having a vertical passage which is axially aligned with said opening in said stop member when said support arm is in said second position, said vertical passage in said support arm being located substantially at an intermediate position of said support arm between said base portion and said outer portion, a pin insertable in said axially aligned holes in said stop member and said support arm when the latter is in its second position to thereby secure said support arm and manipulator device in a position providing unobstructed and ready access to said workbench, a retaining segment fixed to a front end portion of the base of said support arm, said retaining segment having openings, said machine frame having openings axially aligned with said openings in said retaining segment when the support arm is in said operative position, and threaded means received in said axially aligned openings in said retaining segment and said machine frame for securing said retaining segment and said support arm to said machine frame in the operative position of the support arm.

2. Apparatus according to claim 1 wherein said outer portion of said support arm has a side surface joined to said side surface of said base portion at an obtuse angle.

* * * * *